United States Patent [19]

Bowman et al.

[11] Patent Number: 5,783,774
[45] Date of Patent: Jul. 21, 1998

[54] NON-METALLIC FLOOR BOX

[75] Inventors: Timothy Bowman, Parkersburg, W. Va.; Charles Domigan, Coolville, Ohio; John Stauffer, Parkersburg, W. Va.; Joe Young, Reedsville, Ohio

[73] Assignee: Walker Systems, Inc., Williamstown, W. Va.

[21] Appl. No.: 815,057

[22] Filed: Mar. 11, 1997

Related U.S. Application Data

[63] Continuation of Ser. No. 735,307, Oct. 21, 1996.

[51] Int. Cl.$^6$ ................................................ H02G 3/10
[52] U.S. Cl. ........................................ 174/48; 220/3.2
[58] Field of Search ........................... 174/48, 50, 49, 174/50.55, 50.56, 50.6, 50.62, 58, 60, 57; 220/3.2, 3.6, 3.8, 3.92, 3.94, 3.7; 52/220.5

[56] References Cited

U.S. PATENT DOCUMENTS

| | | | |
|---|---|---|---|
| 1,648,701 | 11/1927 | Smallbrook | 220/3.8 |
| 1,961,728 | 6/1934 | Arnest et al. | |
| 2,378,861 | 6/1945 | Peevey | |
| 2,959,633 | 11/1960 | Palmer et al. | |
| 2,989,206 | 6/1961 | McAfee | |
| 3,343,704 | 9/1967 | Terry | |
| 3,651,245 | 3/1972 | Moll | |
| 4,126,369 | 11/1978 | Rapata et al. | |
| 4,230,234 | 10/1980 | Taylor | 220/18 |
| 4,331,832 | 5/1982 | Curtis et al. | |
| 4,428,492 | 1/1984 | Jorgensen | |
| 4,593,507 | 6/1986 | Hartman | |
| 4,623,170 | 11/1986 | Cornwall | 285/4 |
| 4,728,750 | 3/1988 | Teslovich | |
| 4,967,990 | 11/1990 | Rinderer | 248/205.1 |
| 5,034,567 | 7/1991 | Mohr | |
| 5,042,450 | 8/1991 | Jacobson | 124/44.5 |
| 5,086,194 | 2/1992 | Bruinsma | |

(List continued on next page.)

OTHER PUBLICATIONS

Installation Instructions for Thomas & Betts, 640P Series Floor Box; (1 page) dated 1995.
Installation Instructions for Carlon non-metallic floor box (1 page); dated Feb., 1988.
Installation Instructions for Hubbell Plastic Floor Box and Accessories (2 pages); dated May 1990.
Installation Instructions for Walker PVC Floor Box Model 882/884, 1992.
Sales Brochure for Carlon Plastic Floor Box, 1992.
Sales Brochure for Hubbell Plastic Floor Box, Jul., 1991.

*Primary Examiner*—Kristine L. Kincaid
*Assistant Examiner*—Dhiru R. Patel
*Attorney, Agent, or Firm*—McAndrews, Held & Malloy, Ltd.

[57] ABSTRACT

A non-metallic floor box for use in electrical in-floor power and communication distribution systems includes a plurality of sets of vertically aligned indexing teeth formed in the interior of the housing side wall. An adapter ring is sized for insertion into the housing interior for supporting an activation kit above the housing interior compartment. The adapter ring has flanges extending from its periphery which are positioned to reciprocally mate with the vertical rows of teeth when the adapter ring is inserted into the housing interior compartment. The flanges and teeth are constructed to permit the ring to be inserted into the housing but to restrict its removal from the housing after its insertion therein. An activation cover is securable to the top of the adapter ring and extends beyond the perimeter of the side wall to limit the distance the adapter ring can be inserted into the housing. The floor box accommodates dual services through the use of two sets of parallel aligned conduit hubs and a divider which is insertable into the housing interior between the two sets of conduit hubs. The closed top of the housing acts as a concrete cover during the pouring of the floor, and as a temporary debris cover after it is cut off but prior to activation of the floor box. Gradient markings on the interior of the floor box provide a quick and accurate measurement of interior floor box volume for inspection and building code compliance.

18 Claims, 6 Drawing Sheets

U.S. PATENT DOCUMENTS

| | | |
|---|---|---|
| 5,125,199 | 6/1992 | Whitney et al. . |
| 5,160,808 | 11/1992 | Hadfield . |
| 5,162,612 | 11/1992 | Naka et al. . |
| 5,223,673 | 6/1993 | Mason .................................... 174/53 |
| 5,257,487 | 11/1993 | Bantz et al. . |
| 5,276,279 | 1/1994 | Brownlie et al. . |
| 5,285,009 | 2/1994 | Bowman et al. . |
| 5,304,736 | 4/1994 | Halfacre . |
| 5,326,060 | 7/1994 | Chubb et al. . |
| 5,350,884 | 9/1994 | Littrell . |
| 5,360,130 | 11/1994 | Lehmann et al. . |
| 5,362,922 | 11/1994 | Whitehead . |
| 5,466,886 | 11/1995 | Lengyel et al. ........................... 174/98 |
| 5,477,649 | 12/1995 | Bessert . |
| 5,548,086 | 8/1996 | Greenfield et al. ....................... 174/98 |

NON-METALLIC FLOOR BOX

CROSS REFERENCE TO RELATED APPLICATIONS

This is a continuation of U.S. application Ser. No. 08/735,307 filed Oct. 21, 1996.

STATEMENT REGARDING FEDERALLY SPONSORED RESEARCH OR DEVELOPMENT

Not Applicable.

BACKGROUND OF THE INVENTION

The invention relates in general to electrical in-floor power and communications distribution systems for office buildings and the like, and in particular to a non-metallic floor box accommodating varying floor material depths and multiple services.

Conventional electrical floor boxes are difficult to install in poured floors because the height of the floor box is fixed. As a result, it is typically necessary for the installer to support the floor box above the subfloor and to go through complicated leveling processes to ensure the top of the floor box is flush and level with the top of the poured floor in which it is set.

In recognition of these problems, it is known to provide floor boxes which are set in pour concrete floors and then sawed off to accommodate the depth of the poured floor. These floor boxes are generally referred to as "cutable" floor boxes in the present application. Examples of cutable floor boxes are found in U.S. Pat. No. 3,343,704 to Terry and U.S. Pat. No. 5,466,886 to Lengyel et al. However, known cutable floor boxes suffer from several drawbacks. Specifically, these devices typically have an open top, and hence, they require a separate cover assembly to protect the interior of the box from debris and materials during the concrete pour and before activation.

Additionally, building codes dictate the amount and type of electrical wiring and connections (a floor box may contain as a function of its interior volume. In a cutable floor box which necessarily has a variable interior volume, this volume has to be determined prior to wiring and activation in order to meet building code requirements.

The National Electric Code ("N.E.C.") also require that boxes which accommodate multiple services, e.g. electrical and data, be designed to maintain physical separation between the various services within the box. known cutable floor box designs, such as the Lengyle et al. '866 patent, rely on complicated tunnels and/or dividers for maintaining the required separation. These devices are complex to manufacture and are difficult and time consuming to install.

Activation kits provide a further complication in designing cutable floor boxes. Specifically, because these floor boxes are designed to be sawed off after installation, it is difficult to provide a mechanism for securing the activation kit to floor box. In most instances the activation kit (or leveling ring) is simply glued into the floor box. Accordingly, the installer must be careful when gluing the activation kit to the housing to ensure proper positioning of the ring with respect to the housing. In recognition of this problem the Lengyel et al. '866 patent discloses a leveling assembly which utilizes a leveling ring having retaining clips which secure into elongated slots formed in the interior of the housing. This design relies on numerous components, and hence, is undesirable from both a manufacturing and an installation standpoint.

BRIEF SUMMARY OF THE INVENTION

Accordingly, one object of the invention is to provide a floor box structure which greatly increases the versatility of floor boxes with respect to floor material depth and power and communication service configurations.

Another object of the invention is to provide a floor box which is made installer-friendly by the use of a structure which eliminates the need for pour covers and interior volume measurements.

Another object of the invention is to provide an adjustable height floor box which is easy to manufacture and install in a poured concrete floor.

Yet another object of the invention is to provide an adjustable height floor box including a mechanism for receiving a bracket for mounting an activation kit over the interior volume of the floor box housing.

A further object of the invention is to provide an adjustable height floor box which accommodates multiple services and which maintains physical separation between the services within the floor box.

The above and other objects and advantages are provided by a floor box apparatus comprising a housing having a base, and a vertically extending side wall defining an interior volume. A plurality of sets of vertically aligned indexing teeth are formed on the interior of the housing side wall. An adapter ring is sized for insertion into the housing interior and is adapted to support an activation kit above the housing interior compartment. The adapter ring has a plurality of flanges extending from its periphery which are positioned to reciprocally mate with the vertical rows of teeth when the adapter ring is inserted into the housing interior compartment to secure the adapter ring within the housing. The flanges and teeth are constructed to permit the ring to be inserted into the housing but to restrict removal of the ring from the housing after its insertion therein.

The floor box provides several advantages over existing floor box designs. Specifically, the adapter ring is easy to position and install within the housing. Gradient markings are provided on the interior of the housing and on the divider provide a quick and accurate measurement of interior floor box volume for inspection and building code compliance. Additionally, the top of the housing includes a reduced circumference projection such that after being cut off, the top can be inverted to mate the projection with the interior surface of the vertically extending side wall. As a result, the closed top of the housing serves a dual purpose: acting as a concrete cover during the pouring of the floor, and as a temporary debris cover after it is cut off but prior to activation of the floor box.

The floor box is also designed to accommodate multiple services through the use of two pairs of opposing conduit hubs and a divider which is inserted into the housing interior to maintain separation between the services. The two pairs of hubs are aligned parallel to one another to allow the conduits to remain parallel to each other as they approach the box. The divider is designed to be broken or cut off and includes gradient markings which match up with gradient markings on the housing interior to indicate the appropriate location to cut the divider.

Advantageously, the floor box may be economically fabricated as a two-piece plastic design, where both halves are mirror images and can be easily joined by welding or fusion bonding, for example.

BRIEF DESCRIPTION OF THE SEVERAL VIEWS OF THE DRAWING

For a more complete understanding of this invention reference should now be had to the embodiment illustrated

Figure 1:
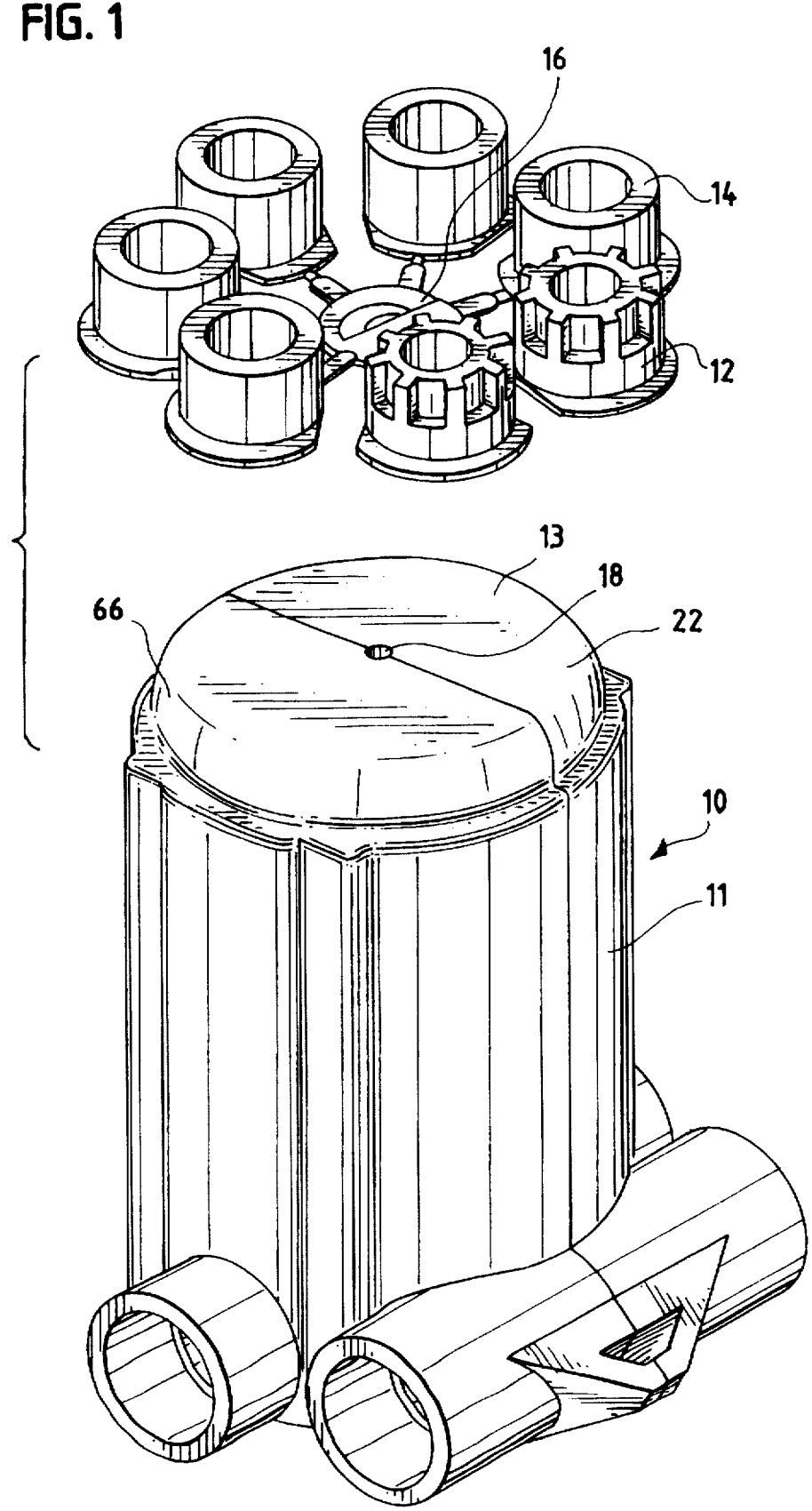

3 in greater detail in the accompanying drawings and described below by way of example of the invention.

In the drawings:

FIG. 1 is an isometric view of one embodiment of the floor box of the present invention, with a ring of reducer plugs removably attached to the exterior of the housing.

Figure 2:
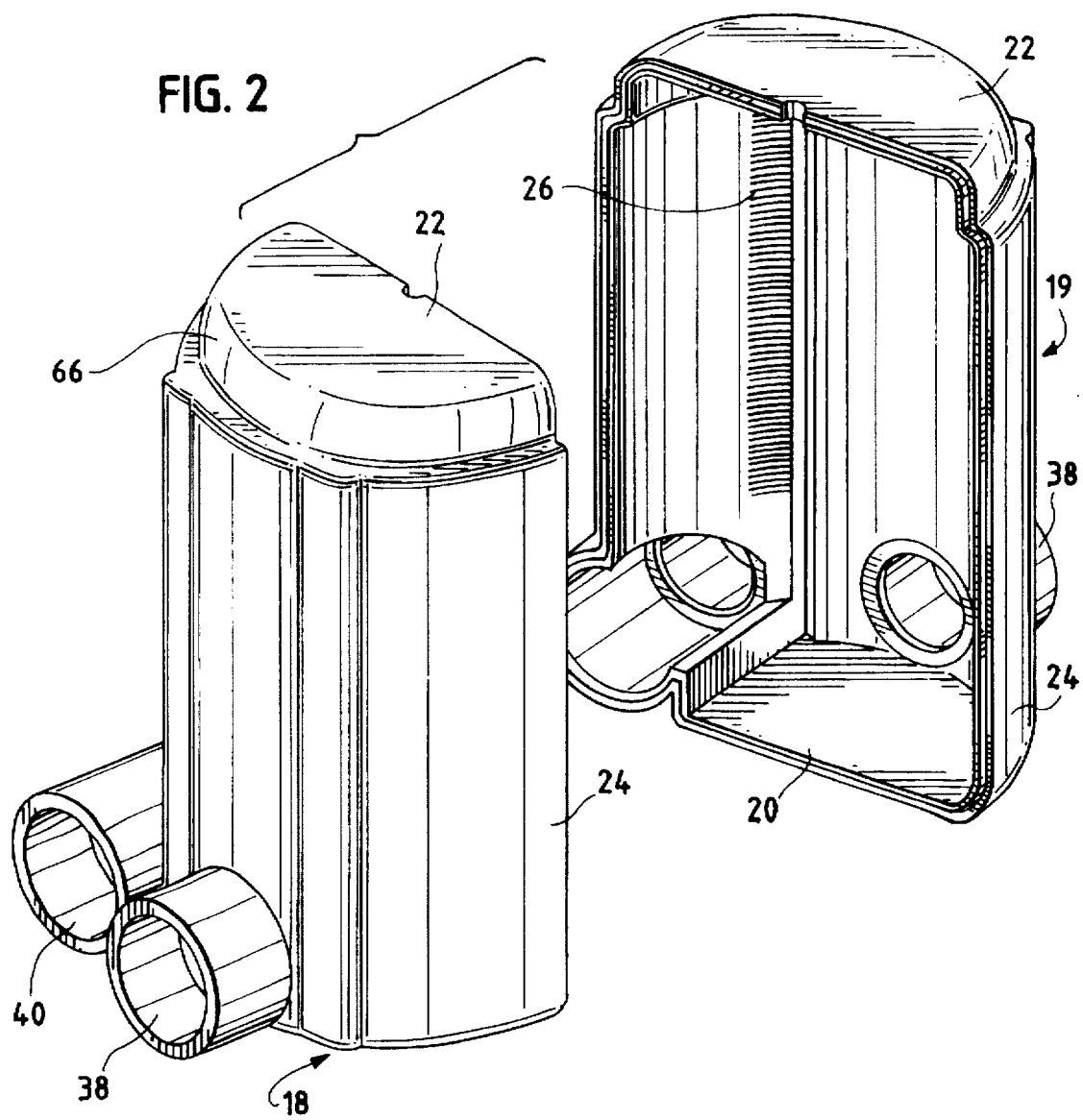

FIG. 2 an isometric view illustrating the two-piece construction of the floor box of FIG. 1.

Figure 3:
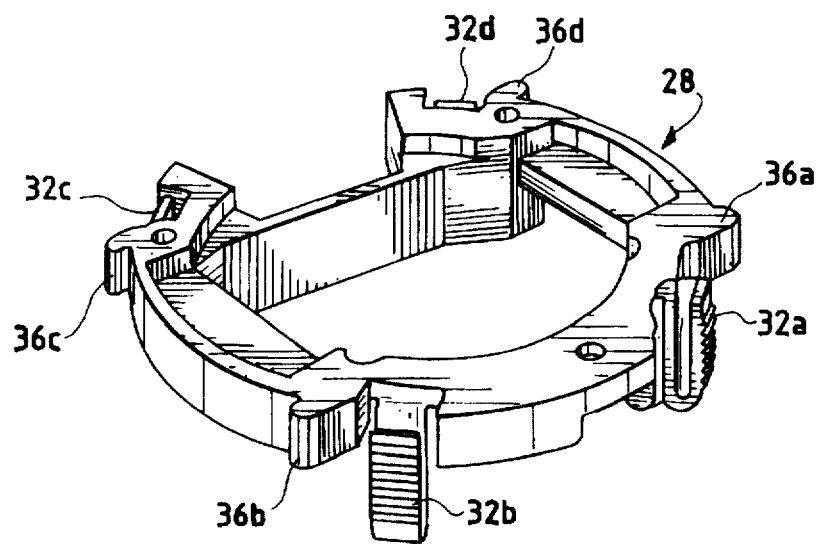

FIG. 3 is an isometric view of an adapter ring constructed in accordance with the present invention.

Figure 4:
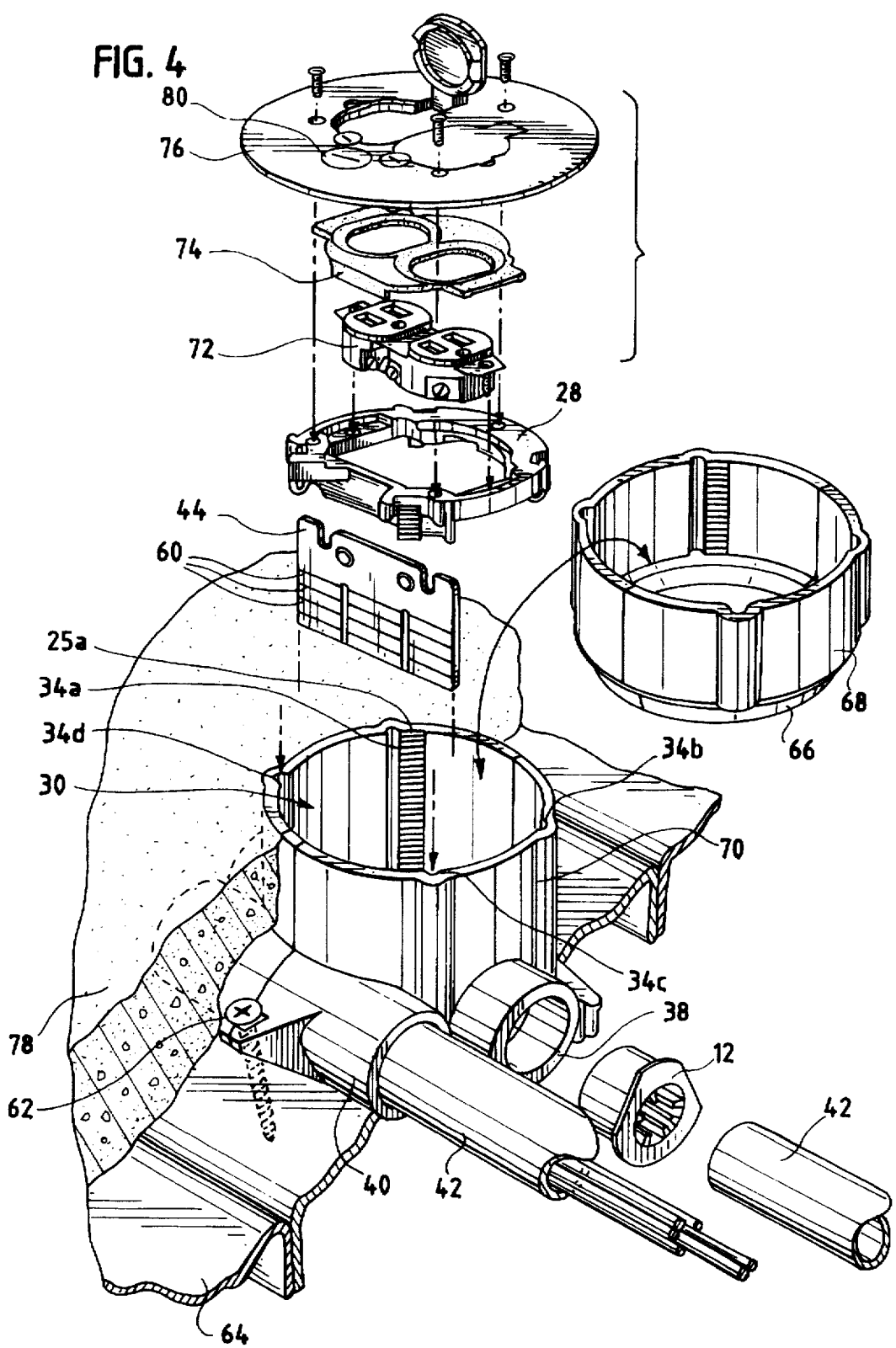

FIG. 4 is an exploded isometric view of the floor box of FIG. 1.

Figure 5:
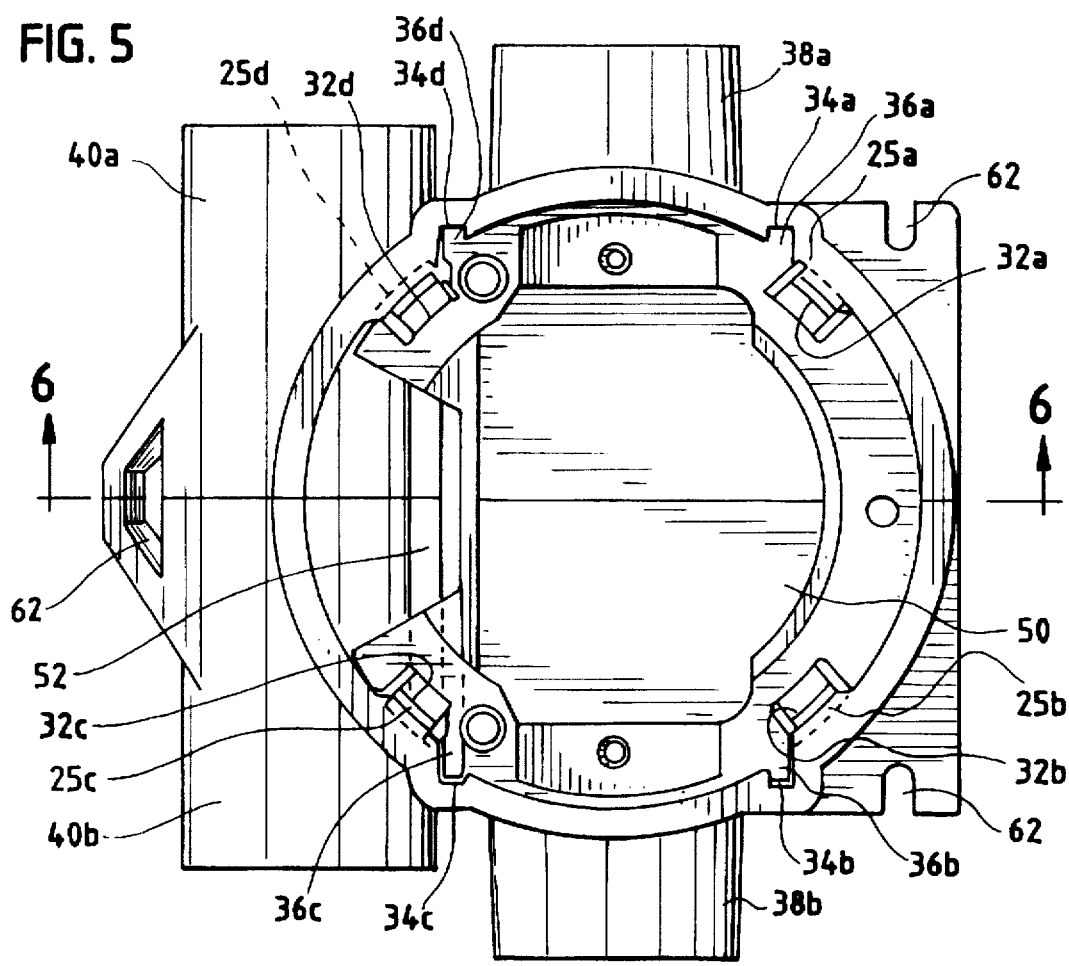

FIG. 5 is a top view of the floor box after the top of the box has been cut off and the adapter ring has been inserted into the box.

Figure 6:
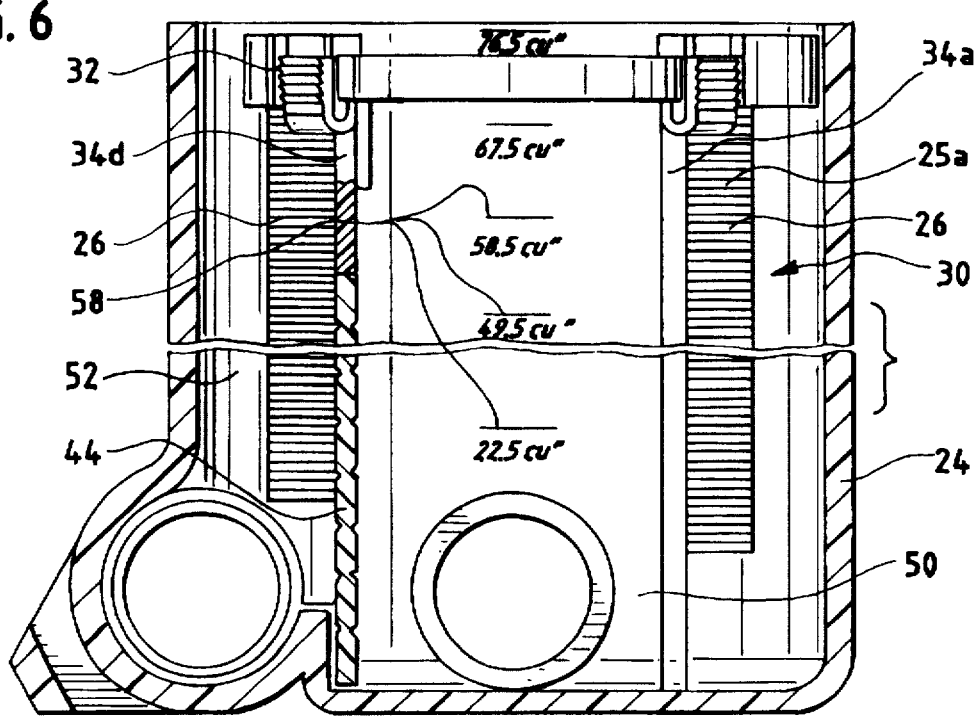

FIG. 6 is cross-section view of the floor box along line 6—6 of FIG. 5.

Figure 7:
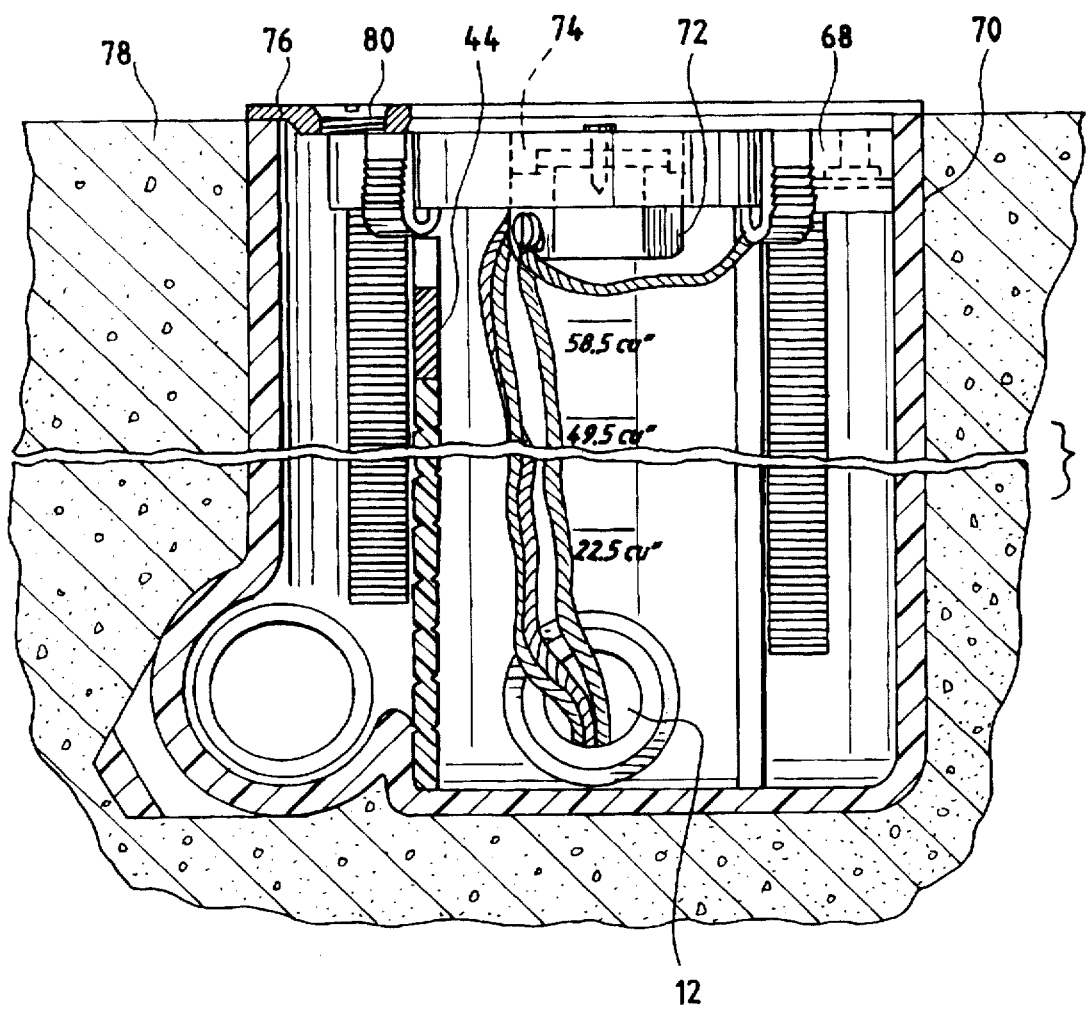

FIG. 7 is a cross-section view from the same view as FIG. 6, showing the activation hit installed in the floor box. (This drawing is being prepared.)

Figure 8:
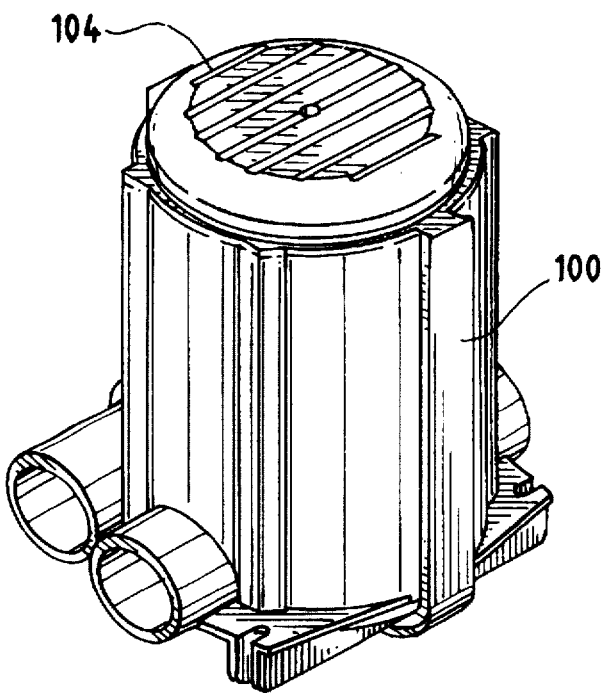

FIG. 8 is a top isometric view of a second embodiment of the floor box.

Figure 9:
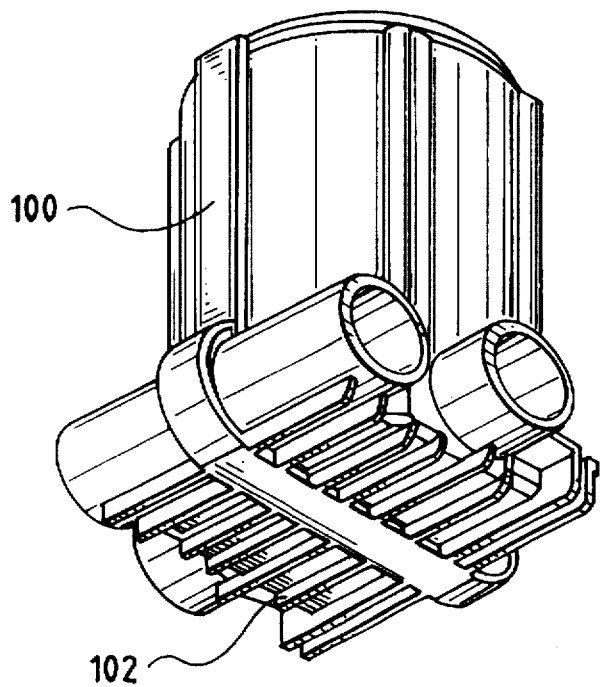

FIG. 9 is a bottom isometric view of the floor box of FIG. 8.

DETAILED DESCRIPTION OF THE INVENTION

Referring now to FIG. 1, the floor box 10 comprises a generally circular housing 11 with an integrally formed top wall 13. Although a round housing is shown, it should be appreciated that the principles of the present invention are equally applicable to rectangular housings. The floor box 10 is referred to as a closed floor box because, in its assembled state, there are no openings (except for the molding tree mounting hole 18) through which concrete or other debris can enter the housing. Hence, unlike conventional floor boxes, there is no need for a separate cover or concrete mud cap to prevent debris or concrete from entering the housing.

The floor box 10 is provided with a plurality of reducers plugs 12 and closure plugs which are shipped to the end user on a molding tree. The molding tree includes a downward protrusion (not shown) which is sized for insertion into a reciprocal opening 18 formed in the top of the floor box 10. Because of the closed floor box arrangement and the ability to attach reducers 12 and closure 14 plugs to the top of the floor box 10, there are fewer loose parts subject to loss or damage during shipping. Upon installation, the installer can separate the appropriate reducers and/or plugs from the molding tree and insert them as needed in conduit hubs formed in the housing.

Preferably the floor box 10 is formed by mating two pieces as shown in FIG. 2. The first piece 18 and the second piece 19 are preferably mirror images of each other and are constructed from molded plastic. The two pieces 18, 19 can be bonded together to form a complete rigid floor box housing. Alternate means for joining the two pieces 18, 19 readily present themselves, such as welding, bolts, adhesives, or snap fittings. Advantages of the two-piece plastic construction include ease and economy of fabrication and the ability to readily form contours (such as teeth) in the interior housing.

The first and second pieces 18, 19 of the floor box 10 each include a base 20, a top 22, and a vertically extending side wall 24. Referring additionally to FIGS. 4–6, a plurality of rows 25a–25d of vertically aligned indexing teeth 26 (see also FIG. 3) are formed on the interior of the housing side wall 24. An adapter ring 28 is sized for insertion into the housing interior (after the top is sawed off) and is adapted to support an activation kit above the housing interior compartment 30. The adapter ring 28 has a plurality of toothed flanges 32a–32d extending from its periphery which are positioned to reciprocally mate with the vertical rows 25a–25d of teeth 26 when the adapter ring 28 is inserted into the housing interior compartment. The toothed flanges 32 and teeth 25 in the housing 11 have a rachet-pawl relation which permits the adapter ring 28 to be inserted into the housing, but restricts removal of the ring from the housing after its insertion therein.

A plurality of vertical grooves 34a–34d are formed on the interior of the housing side wall 24. The adapter ring 28 includes outwardly extending protrusions 36a–36d which are oriented to slidably engage in the vertical grooves 34a–34d for fixing the axial orientation of the adapter ring 28 relative to the floor box housing 11.

The exterior of the housing side wall 26 includes a two sets of integrally formed, opposing conduit hubs 38, 40. The conduit hubs 38, 40 open to the housing interior and are adapted for receiving electrical conduit 42 as shown in FIG. 4 to permit wiring to be routed into the housing interior. Where necessary, reducer plugs 12 or closure plugs 14 can also be inserted into the hubs 34, 40. Providing two sets of hubs 38a, 38b; 40a, 40b allows multiple services, e.g. telephone and electrical, to be carried by the box. The hubs in each set are positioned on opposite sides of the housing 11, whereas the two sets 38, 40 of hubs run parallel to each other. This orientation permits the service conduits to remain parallel to each other as they approach the box, thereby eliminating the need to sweep one of the conduits to the side as is required in boxes where the conduit hubs are at ninety degree offsets.

A plate-like compartment divider 44 is insertable into the housing interior to divide the interior into two sub-compartments (i.e. a power sub-compartment 50 and a communications sub-compartment 52) and to maintain physical separation between the services to the box. For this purpose, two of the vertical grooves 34c, 34d are positioned between the two pairs of conduit hubs for receiving the divider 48.

Referring to FIG. 6, the interior of the side wall 24 includes gradient markings 58 indicating the interior volume of the entire floor box 10 housing as measured from the base 20 to the respective marking 58. Similar markings can be located on the exterior of the floor box 10 to readily indicate the depth of concrete surrounding the floor box 10. The divider 44 is designed to be broken or cut off and includes markings which match up with markings 58 on the interior of the housing to indicate the appropriate location to cut the divider.

The bottom wall 24 includes securing means 62 for attaching the floor box 10 to a floor surface 64 as shown in FIG. 4. Securing means 40 provides an opening for receiving a fastener, such as a bolt, nail, screw, or the like.

Referring again to FIGS. 1, 2 and 4 the top of the floor box 10 includes a reduced diameter projection 66 having an outer diameter which is slightly smaller than the interior diameter of the housing side wall 24. Accordingly, as shown in FIG. 4, the cut off upper portion 68 of the floor box 10 can be inverted and placed over the lower portion 70, to act as a temporary cover. The temporary cover is used after the concrete pour but prior to activation of the floor box 10. The cover provides easy access to the interior of the housing for wiring and connection services, yet keeps unwanted debris and material from entering the housing.

As can be seen in FIGS. 4–7, the adapter ring 28 is adapted to support an activation kit above the housing interior compartment. The activation kit may include a duplex outlet 72, a duplex cover 74 and an activation cover 76.

The operation of the floor box 10 may best be understood upon reference to FIGS. 4 and 7 which show the floor box 10 fixed to a floor surface 64 by securing means 62. Appropriate connections are made to the floor box 10 by fitting electrical conduits 42 into hubs 38, 40. If necessary, reducer plugs 12 can be used to reduce the inside diameter of flange 28 prior to fitting conduit 42. Additionally, in single service installations closure plugs 14 can be inserted into the unused hubs 38, 40 to seal the housing interior compartment 30.

Once the appropriate conduit connections are made, concrete 78 is poured to the desired depth. After the concrete is poured and set, pour the upper portion 68 of the floor box 10 is sawed off flush with or slightly above and parallel to the upper surface of the concrete 78. The type of floor covering and activation kit used will determine the amount of housing to remain extending above the upper surface of the concrete 49.

After removal of the upper portion 68, the interior of the housing 11 is exposed as shown in FIG. 4. Gradient markings 58 indicate the interior volume of the remaining housing. If the compartment divider 44 is to be installed, the divider 44 is cut off at the appropriate location and slid into the vertical grooves 34c, 34d. This process is greatly simplified by the gradient markings 60 on the divider 44 which correspond to those on the housing interior, thereby indicating the appropriate location at which to cut the divider.

The electrical conductors are then connected to the duplex outlet 72 according to the N.E.C. and local codes. Once the duplex outlet 72 is wired, it is fastened to the adapter ring by a pair of threaded fasteners which extend through apertures in the duplex in thread into the adapter ring 28. The duplex cover 74 is then placed over the duplex outlet. The duplex cover serves to electrically isolate the electrical outlet from the communications compartment. This cover 74 is not required in single service applications.

The activation cover 76 is then fastened to the adapter ring by fasteners which extend through the cover and thread into the adapter ring 28. If data service is provided, the data lines are then poked through an opening located in the activation cover 76. The opening may include a grommet for sealing about the data cable.

The assembly is completed by aligning the protrusions 36a–36d on the adapter ring 28 with the grooves 34a–34d in the housing interior and inserting the ring into the housing interior. As the adapter ring 28 moves into the housing, the toothed flanges 32a–32d engage the reciprocal teeth 25a–25d formed in the housing 11 interior. The adapter ring/cover combination is pushed into the housing until the bottom of the adapter cover 76 abuts the top of the housing side wall. The periphery of the cover 76 extends beyond that of the housing side wall 24, and hence, the interface between the cover 76 and the housing side wall 24 serves as a stop for limiting the distance which the adapter ring 76 can be inserted into the housing 36.

FIGS. 8 and 9 show a second embodiment of the floor box. In the second embodiment (FIGS. 8 and 9), a flange 100 is formed along the junction of the first and second pieces 18, 19 of the housing 11. This flange 100 adds to the strength of the housing 11, provides a wider bead for welding, and provides a better surface to grip while the housing portions 18, 19 are being joined. The second embodiment (FIGS. 8 and 9) also has raised ribs 102, 104, formed on the exterior of the base 20 and the top wall 22, respectively.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

We claim:

1. A floor box for mounting in a concrete floor, the floor box comprising:
   a housing having a base, a vertically extending side wall defining an interior compartment, and a plurality of sets of vertically aligned indexing teeth formed on the interior of the housing side wall;
   an adapter ring sized for insertion into the housing interior compartment and being adapted to support an activation kit above the housing interior compartment, the adapter ring having a plurality of flanges extending from its periphery which are positioned to reciprocally mate with the sets of vertically aligned indexing teeth when the adapter ring is inserted into the housing interior compartment to secure the adapter ring within the housing; and
   wherein the flanges and teeth are constructed to permit the adapter ring to be inserted into the housing but to restrict removal of the adapter ring from the housing after its insertion therein.

2. The floor box of claim 1, further comprising gradient markings disposed on at least one surface of the side wall, the markings indicating an interior volume of the housing measured from the base to a respective one of the markings.

3. The floor box of claim 2, wherein the gradient markings are disposed on the interior surface of the side wall.

4. The floor box of claim 1, wherein the housing further includes an integrally formed top defining a projection having a reduced circumference with respect to the vertically extending side wall such that after being cut off, the top can be inverted to mate the projection with the interior surface of the vertically extending side wall.

5. The floor box of claim 1, wherein the housing side wall is cylindrical in shape.

6. The floor box of claim 1, wherein the housing is formed of two mirror image portions which are joined together during manufacture.

7. The floor box of claim 1 further comprising two pair of opposed conduit hubs extending from the exterior of the housing side wall and opening to the housing interior compartments, the two pair of hubs being generally parallel to each other, and the hubs in a respective pair being generally opposite each other.

8. The floor box of claim 1, wherein the activation kit comprises an activation cover which is fixedly securable to the top of the adapter ring, the periphery of the activation cover extending beyond that of the housing side wall so as to restrict inward movement of the adapter ring into the housing interior compartment.

9. The floor box of claim 1, wherein the housing is formed of a non-metallic material.

10. The floor box of claim 1, further comprising means for securing the floor box to a floor surface.

11. A floor box for mounting in a concrete floor, the floor box comprising:

a housing having a base, a vertically extending side wall defining an interior compartment, and a plurality of sets of vertically aligned indexing teeth formed on the interior of the housing side wall;

an adapter ring sized for insertion into the housing interior compartment and being adapted to support an activation kit above the housing interior compartment, the adapter ring having a plurality of flanges extending from its periphery which are positioned to reciprocally mate with the sets of vertically aligned indexing teeth when the adapter ring is inserted into the housing interior compartment to secure the adapter ring within the housing:

wherein the side wall further has at least one vertical groove formed on said interior; and wherein the adapter ring further includes at least one outwardly extending protrusion positioned to slidably engage in the at least one vertical groove for fixing the axial orientation of the adapter ring relative to the housing.

12. The floor box of claim 11, wherein the at least one vertical groove comprises two pairs of opposed vertical grooves.

13. The floor box of claim 12, wherein at least one pair of opposed vertical grooves is adapted to receive a compartment divider for separating the housing interior compartment into two compartments.

14. The floor box of claim 11, wherein the housing is formed of a non-metallic material.

15. The floor box of claim 11, wherein the housing side wall is cylindrical in shape.

16. A floor box for mounting in a concrete floor, the floor box comprising a housing having a base, a vertically extending side wall defining an interior compartment, and a plurality of sets of vertically aligned indexing teeth formed on the interior of the housing side wall, an adapter ring sized for insertion into the housing interior compartment and being adapted to support an activation kit above the housing interior compartment, the adapter ring having a plurality of flanges extending from its periphery which are positioned to reciprocally mate with the sets of vertically aligned indexing teeth when the adapter ring is inserted into the housing interior compartment to secure the adapter ring within the housing:

two pair of opposed conduit hubs extending from the exterior of the housing side wall and opening to the housing interior compartment the two pair of hubs being generally parallel to each other, and the hubs in a respective pair being generally opposite each other;

a compartment divider adapted for insertion into the housing interior compartment; and wherein the housing sidewall includes a set of opposed vertical slots positioned between the pairs of conduit hubs, the slots being adapted to receive the compartment divider for separating the housing interior compartment into two compartments wherein each of said pairs of hubs opens to a different one of said compartments.

17. The floor box of claim 12, wherein the housing is formed of a non-metallic material.

18. The floor box of claim 16, wherein the housing side wall is cylindrical in shape.

* * * * *